June 29, 1937.  F. H. MUSSLER  2,085,684
MACHINE TOOL HEADSTOCK
Filed Feb. 8, 1933  3 Sheets-Sheet 2

INVENTOR.
Frank H. Mussler
BY A. T. Sperry
ATTORNEY.

June 29, 1937.  F. H. MUSSLER  2,085,684
MACHINE TOOL HEADSTOCK
Filed Feb. 8, 1933  3 Sheets-Sheet 3
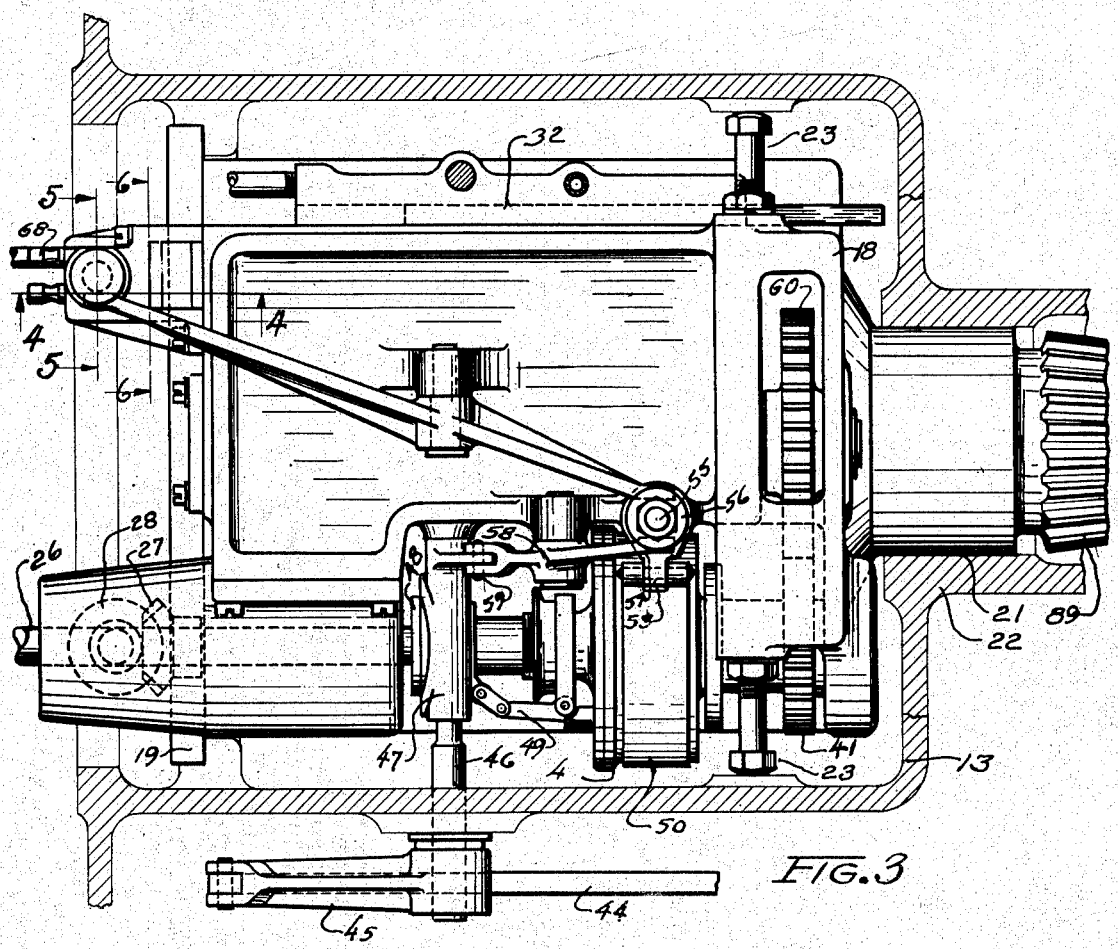
INVENTOR.
FRANK H. MUSSLER
BY
ATTORNEY.

Patented June 29, 1937

2,085,684

UNITED STATES PATENT OFFICE 2,085,684

MACHINE TOOL HEADSTOCK

Frank H. Mussler, Stratford, Conn., assignor to The Bullard Company, a corporation of Connecticut Application February 8, 1933, Serial No. 655,735

11 Claims. (Cl. 74—483)

It is one of the prime objects of the present invention to provide a compact, simplified headstock unit and one particularly applicable as a removable speed change drive for machine tools.

Another object is to provide a transmission mechanism including gear shifting means which may be remotely controlled.

Another object is to provide a transmission mechanism, the gear shifting units of which are automatically controlled to prevent double gear contacts, the movements of some units being arranged to prevent movement of some others thus to provide automatic self-actuating interlocking.

Another object is to provide an interlock between the shifting units and the main clutch so as to prevent throwing of the clutch while the gears are in improper position or during their movement.

Another object is to provide a self-contained unit head stock construction embodying in a single instrumentality not only the gears and the main clutch, but also power gear shifting means and the control and interlock mechanisms referred to.

Another object is to provide in a headstock, structural interrelation of parts and combinations thereof such that the unit is particularly adapted for a compact assembly designed to be removable as a unit from the mechanism to which it is applied.

Numerous other objects will be obvious from a consideration of the specification and drawings.

While the form of the invention herein illustrated and described is specifically designed for use in machine tools and while being illustrated in combination with a lathe type of tool, it may obviously be applicable to milling machines, drills or in general to various machines both in and out of the metal working arts. The invention is a companion invention of that shown in application, Serial No. 614,185, filed November 4, 1932 and as such partakes of the unit construction therein illustrated. The present invention is specifically concerned with the gear shifting structure, its interlock, and the main clutch and its interlock.

In the drawings

Fig. 3 is a top plan view of the unit.

Fig. 4 is a detail section taken on the line 4—4 of Fig. 3.

Fig. 5 is a section taken on the line 5—5 of Figs. 3 and 4, and

Fig. 6 is a detail taken on the line 6—6 of Figs. 3 and 4.

Figure 1:
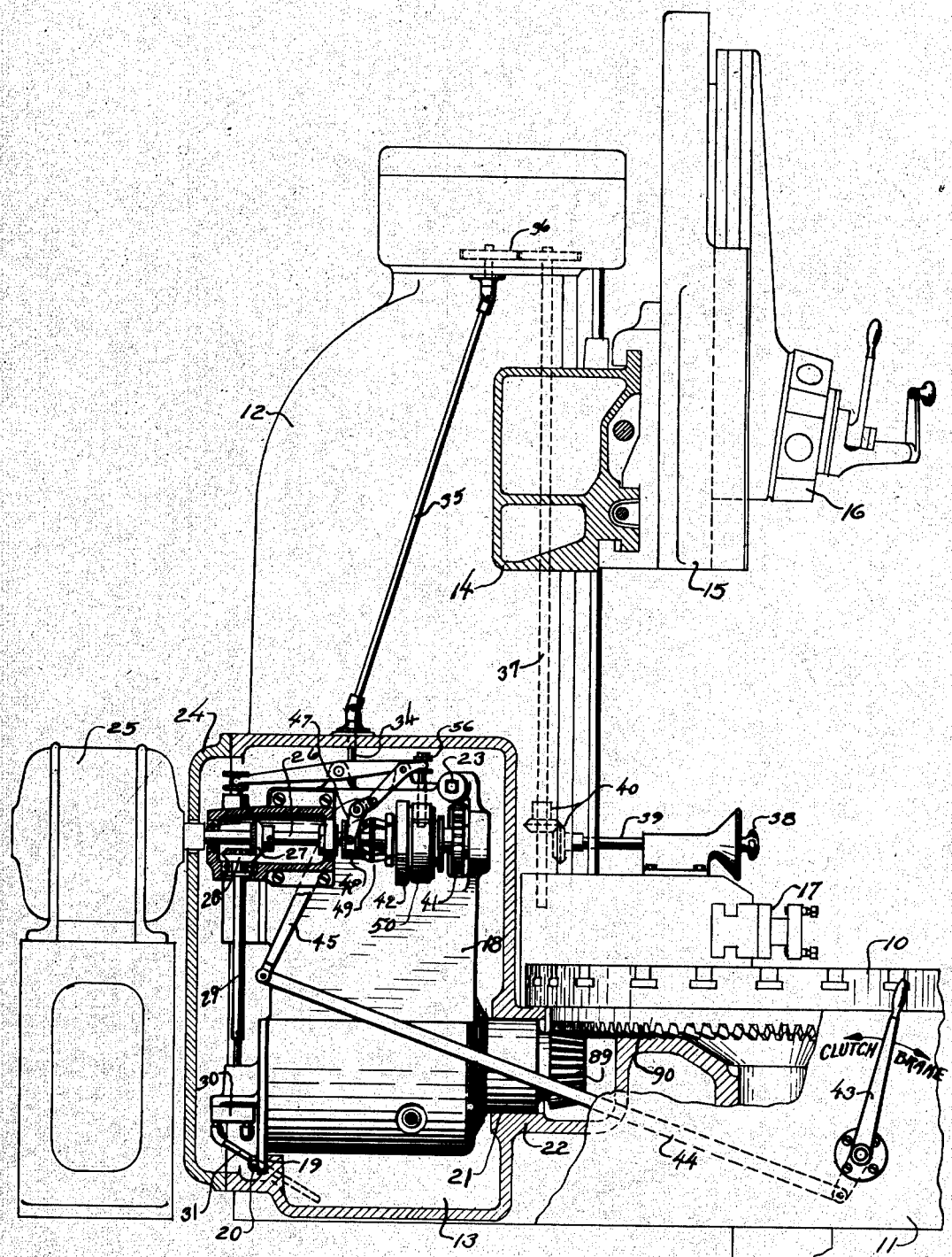
Fig. 1 is a side elevation of a machine tool equipped with the present headstock, the base of the machine being broken away to show the headstock in position.

With particular reference to the drawings, it will be understood that the invention is not confined to the structural details which are here shown by way of illustrating one practical embodiment of the inventive concept. The invention is illustrated as associated with a single spindle vertical turret lathe type of machine tool. The rotatable work holder or table 10 is mounted in the base 11 which extends rearwardly to combine with a vertical column 12 and which is formed to provide a headstock compartment 13. The upper front face of the column 12 preferably carries a cross-rail 14 upon which is mounted a saddle 15 which may support a conventional type turret 16. In connection with this particular type of machine, it will be understood that work mounted on the table for rotation therewith is subjected to the action of tools carried by the turret 16 or by tools carried by side heads such as indicated at 17. Since this type of machine is well known in the art and since the invention is not confined or restricted to application to this type of machine, further reference to the fundamentals of the machine seem unnecessary, it being understood, of course, that drive means are provided extending from the drive unit as hereinafter to be explained to the saddle and tool slide whereby they may be operated from a single source of power. Suitable feed change or power traverse mechanisms may be provided for the turret or tool slide as dictated by the desires of the designer.

As set forth in the co-pending application above identified, the elements forming the present combination are grouped and combined in a single unit comprising a head stock unit housing 18 which is removably mounted within the compartment 13, a lower rear flange 19 of the housing being bolted as at 20 to a cooperating flange of the compartment. The opposite lower end of the housing is of cylindrical formation as at 21 to be received within a cooperating bearing portion 22 of the base. The upper end of the housing is supported against rocking movement by adjustable threaded bolts 23 which may be adjusted to bear against the sides of the compartment, the whole being arranged to securely and removably mount the unit within the compartment. By detachment of the connection at 20 and adjustment of the bolts 23, the entire unit may be withdrawn from the compartment through the rear cover 24 thereof.

The drive for the unit is provided by a suitable source of power such as the motor 25, the shaft of which is designed for removable driving relation with the primary power shaft 26 of the unit. The primary and constantly running shaft 26 is provided with a bevel gear 27 meshing with the cooperating bevel gear 28 for constantly driving a pump shaft 29 which operates a pump 30 for drawing lubricating, and/or fluid pressure supplying, oil from the pipe 31 leading from an oil sump, formed in the base of the compartment, up to the fluid pressure supplying duct of the shift rod controlling valve and/or to lubricating passages. It will be understood that the actuating means for the gear shifting rods may be of the fluid pressure type set forth in detail in my prior Patent No. 1,794,472. Obviously, equivalent fluid pressure or mechanical shifting means may be employed and it is not deemed necessary to burden this application with the details of construction or operation of such mechanism. Suffice it, therefore, to say that remotely controlled power means are contemplated.

Figure 2:
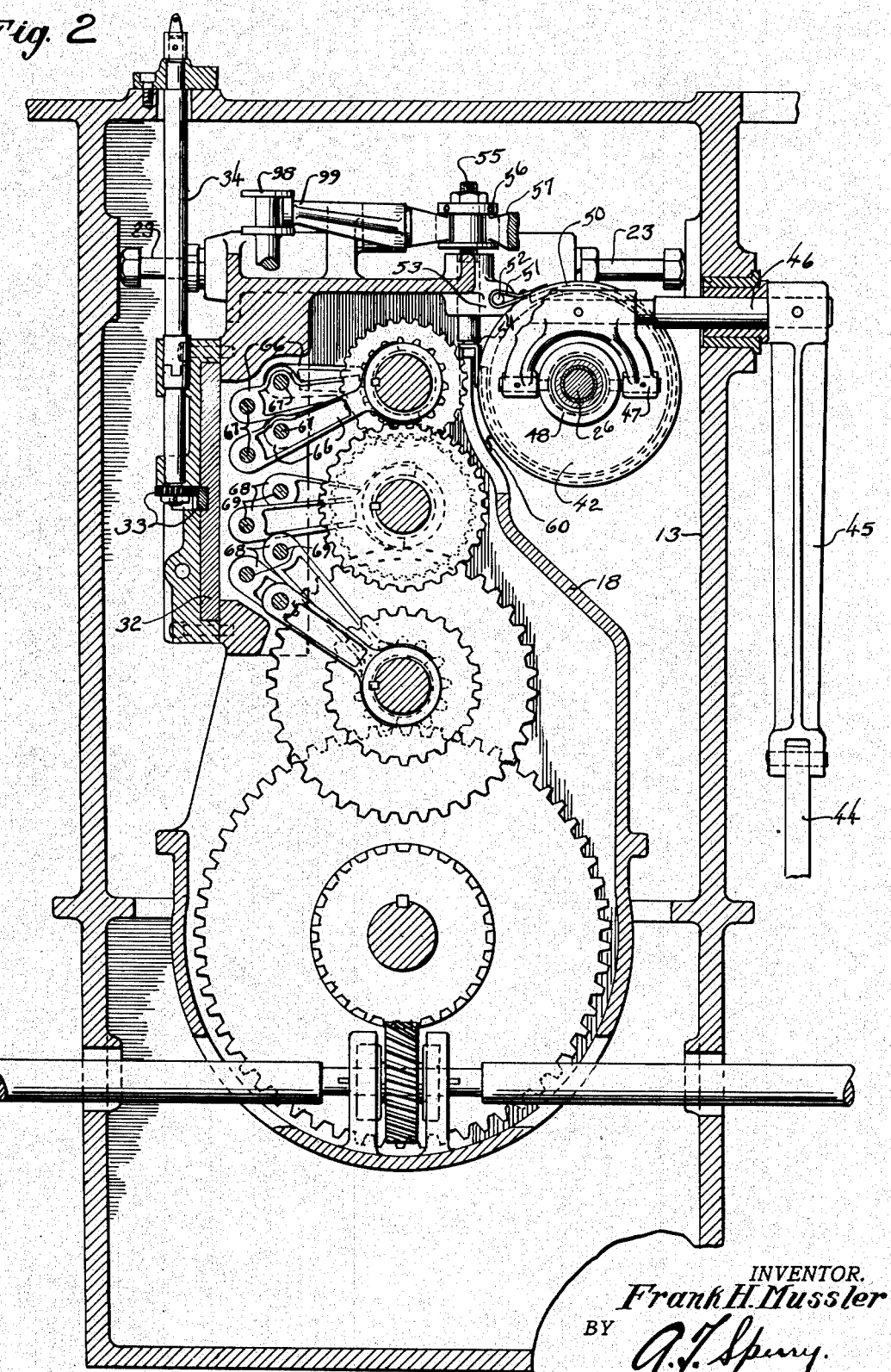
Fig. 2 is a vertical sectional view through the headstock.

As an illustration of a specific shift rod control mechanism, Figs. 1 and 2 illustrate a fluid pressure distribution valve plate 32 which is adapted to be driven by a rack and pinion connection 33 controlled by a detachable rod 34 which in turn is adapted to be rotated by rod 35, gears 36 and a rod 37 mounted within the column. Thus, remote control of the valve setting may be maintained by the knob 38 through its rod 39 and bevel gears 40. Obviously, the invention is not concerned with the specific valve plate nor the specific structural means here illustrated for controlling it. Other means may be used for actuating the valve plate from a suitable convenient location, preferably from the work station of the machine.

Power from the primary shaft 26 may be delivered to a primary drive gear 41 through a clutch element 42 which may be actuated by the main clutch control lever 43 and its link 44. As shown more clearly in Figs. 2 and 3, the link is connected with a lever 45 which is secured at one end to a transversely extending rock shaft 46 whereby pivotal movement of the hand lever 43 and responsive movement of the lever 45 will rock the shaft 46. The shaft 46 carries forked arms 47 which engage a clutch actuating collar 48, movements of which will act through toggle links 49 to engage the clutch 42 upon pivotal movement of the hand lever 43 in the direction of the arrow marked "clutch". Thus, when the rock shaft 46 is rotated in a counterclockwise direction and the arms 47 are thus moved forwardly, the clutch which is of conventional construction will be engaged and the clutch element 42 and the primary drive gear 41 will thus be rotated with the primary drive shaft 26 thus, to drive gear 60 of the change speed gears.

When the clutch is disengaged by reverse movements of the parts, it is frequently advantageous to retard continued movement as by momentum of the gear 41 of the associated head stock train. This may be accomplished through the provision of a band brake 50 which encircles the clutch housing. The upper end 51 of the band brake is fixed by a stationary pin 52 to a projection 53 in the housing 18. The opposite end of the brake is secured as at 54 to a reciprocating vertically disposed plunger 55, the upper end of which protrudes from the top of the housing and is provided with a spool-like collar 56 which receives between its flanges the forward end 57 of a manually operated bell crank lever which is pivoted from the main housing as at 58, its opposite end being connected at 59 with a lug carried by the shaft 46. Thus, when the parts move in counterclockwise direction for the actuation of the clutch to complete the drive, the connection 59 rocks the bell crank lever in clockwise direction, thus moving the rod 55 downwardly to insure release of the clutch housing by the band brake. When the handle 43 is moved in the opposite direction past neutral as indicated by the arrow marked "brake" in Fig. 1, the rock shaft 46 will be rotated in clockwise direction, whereby the forward end 57 of the bell crank will be raised and will raise with it the rod 55 thus applying tension of the brake upon the clutch housing thus to retard continued movement thereof.

By this arrangement, it will be seen that the main clutch may be conveniently controlled by hand and that in conjunction with such control, a brake may be applied or released, the arrangement being such that the brake can not be applied when the clutch is engaged. The arrangement further supplies a neutral position when the clutch may be disengaged without applying the brake.

By referring to Fig. 1, it will be noted that the forward end of the shaft 83 carries a bevel gear 89 which is adapted to drive gear 90 on the lower face of the table. Obviously, some other conventional table drive may be substituted.

With reference to Figs. 4 and 6, it will be seen that means are provided for controlling the interrelation of the gear shifting rods 68 and 69 so as to prevent their misadjustment such as might result in the enmeshment of more than one train of gears. Each rod 68 or 69 is provided with a pair of spaced angularly formed grooves 92, the side walls of which are slanting outwardly to form cam surfaces. The grooves 92 are adapted to cooperate with apertured rod interlocking plates 93 which are loosely mounted within suitable guide spaces formed in a control bracket extension 94 of the unit frame 18. From further consideration of the drawings, it will be noted that the upper four rods are arranged to extend through the upper pair of plates 93. The two center rods extend through only one such plate while the lower three rods extend through the lower pair of plates. As seen more clearly in Fig. 4, it will be noted that the outer plate 93 has been raised by the extension of the first of the upper rods 92 therethrough, thus bringing the lower edge of the aperture of the third rod into engagement with the first groove thereof. Similarly, the second plate has been raised. If, however, the first rod were moved so that its second groove registered with the aperture of the second plate, the third rod would be free to move and its movement would lock the first rod. In like manner all four of the rods are interrelated through the plates. As seen in Fig. 6, the interlocking movement may be a side movement thus to interlock two parallel rods. It will readily be seen that the arrangement of grooves and plates may be such as to preclude any undesirable rod position combinations. By the use of a plurality of such plates various interlocking combinations may be provided for so as to control a plurality of rods. However, for the control of merely two rods as indicated by the center two rods of the combination shown, only a single plate need be used since movement of one can be arranged to block movement of the other without recourse to a second plate.

Means are also provided for preventing full engagement of the main clutch except at such times as when the gears are in proper relation as by proper position of the various rods. To this end, each rod is provided adjacent its end with a pair of shallow reduced portions 95, there being as many such portions as there are operable positions for each rod, in the present instance two being sufficient. When the rods are in properly adjusted position, the shallow portions 95 register with a vertical bore in the bracket 94 through which extends a notched clutch control rod 97, the upper end of which is provided with a spool 98 engaging the rear extension 99 of the crosslever which through the link pivoted at 58 controls the throwing of the main clutch. It will be seen that should a rod be out of its operable position, neither of its notches will register with the bore and thus a vertical movement of the rod 97 will be prevented by the striking of its notched wall with such rod. Thus, it will be seen that the full throwing of the clutch will be prevented except at such times as when all of the rods are positioned for an operative gear combination. In order to provide for a slight snubbing of the clutch, which may be desirable in instances where the gears are not properly adjusted through a sidewise clashing of the gear teeth, it will be noted that the notches of the rod 97 are slightly elongated thus to permit a restricted reciprocal movement of the rod 97 regardless of the gear position. However, the movement is such as to permit slight snubbing action and to prevent full clutch engagement.

From the foregoing it will be observed that the invention provides a simple, efficient and effective structure for carrying out the desiderata set forth. Obviously, numerous changes and modifications may be resorted to without departing from the spirit or scope of the appended claims.

Having thus set forth the nature of my invention what I claim is:

1. In an interlocking mechanism for gear shifting rods, the combination, with a plurality of groups of rods, each group including two or more rods of interlocking means for the rods of each group comprising apertured plates through which the rods extend and which are movable by certain of the rods to preclude movement of certain other rods, said means including one plate for groups of only two rods and two such plates for groups of three or more rods.

2. An interlocking mechanism comprising a plurality of movable rods, said rods being adapted to move shiftable gears in a variable speed transmission or the like, plate means for interlocking a plurality of the rods leaving certain other of the rods free, and means for interlocking the said certain other of the rods whereby all of the rods are held in a predetermined proper position for an operative gear combination.

3. An interlocking mechanism comprising a plurality of movable rods, the rods being capable of moving shiftable gears in a variable speed transmission or the like, plates having openings therein through which openings the rods pass and when in a predetermined position interlock a plurality of the rods leaving certain other of the rods free, and means for interlocking the said certain other of the rods whereby all of the rods are held in a fixed proper position for an operative gear combination.

4. An interlocking mechanism comprising a plurality of movable rods each having at least one annular groove therein, said rods being adapted to move shiftable gears in a variable speed transmission or the like, movable plate means, means for moving the plate means, the plate means having openings therein through which openings the grooved rods pass and when in a predetermined moved position where some of the annular grooves are opposite the said openings and a portion of the plate means at the openings is in the annular grooves of the rods an interlocking of the rods thus positioned is effected and certain other of the rods not in such position are free, and means for interlocking the said certain other of the rods whereby all of the rods are held in a fixed proper position for an operative gear combination.

5. An interlocking mechanism as recited in claim 4 wherein the variable speed transmission has in connection therewith a clutch, and the means for interlocking the said certain other of the rods is operated by the clutch whereby all of the rods are held in a fixed proper position for an operative gear combination and as such permitting the clutch to function.

6. An interlocking mechanism comprising a plurality of movable rods, said rods being adapted to move shiftable gears in a variable speed transmission or the like having in connection therewith a clutch, movable plate means for interlocking a plurality of the rods leaving certain other of the rods free, means for moving the plate means, and externally operable means for interlocking the said certain other of the rods whereby all of the rods are held in a fixed proper position for an operative gear combination and as such permitting the clutch to function.

7. An interlocking mechanism comprising a plurality of movable rods, said rods being adapted to move shiftable gears in a variable speed transmission or the like having in connection therewith a clutch, movable plate means for interlocking a plurality of the rods leaving certain other of the rods free, means for moving the plate means, and means adapted to be operated by the clutch for interlocking the said certain other of the rods whereby all of the rods are held in a fixed proper position for an operative gear combination and as such permitting the clutch to function.

8. An interlocking mechanism comprising a plurality of movable rods, said rods being adapted to move shiftable gears in a variable speed transmission or the like having in connection therewith a clutch, movable plate means for interlocking a plurality of the rods, leaving certain other of the rods free, means for moving the plate means, and externally operable means operated by the clutch for interlocking the said certain other of the rods whereby all of the rods are held in a fixed proper position for an operative gear combination and as such permitting the clutch to function.

9. An interlocking mechanism comprising a plurality of movable rods, said rods being adapted to move shiftable gears in a variable speed transmission or the like having in connection therewith a clutch, a plurality of plates, the plates serving to interlock a plurality of the rods while leaving certain other of the rods free, means for interlocking the said certain other of the rods whereby all of the rods are held in a fixed proper position for an operative gear combination, and means for connecting the clutch with the last named means so as to permit the clutch to function only when all of the rods are held in the fixed proper position for an operative gear combination.

10. An interlocking mechanism as recited in claim 9, wherein the plates are movable and are provided with openings through which the rods pass, and means for moving the plates.

11. An interlocking mechanism as recited in claim 9, wherein the plates are movable, and the plates are moved by the rods during shifting of the latter.

FRANK H. MUSSLER.